US011489582B2

(12) United States Patent
Kalhan et al.

(10) Patent No.: US 11,489,582 B2
(45) Date of Patent: Nov. 1, 2022

(54) SYSTEM AND METHOD FOR DUAL-CONTROL SIGNALING FOR THE RELAY SCENARIOS

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

(*) Notice: Subject to any disclaimer, the term of this patent is extended or adjusted under 35 U.S.C. 154(b) by 496 days.

(21) Appl. No.: 16/079,275

(22) PCT Filed: Mar. 2, 2017

(86) PCT No.: PCT/US2017/020345
§ 371 (c)(1),
(2) Date: Aug. 23, 2018

(87) PCT Pub. No.: WO2017/151853
PCT Pub. Date: Sep. 8, 2017

(65) Prior Publication Data
US 2019/0044607 A1  Feb. 7, 2019

Related U.S. Application Data

(60) Provisional application No. 62/304,738, filed on Mar. 7, 2016, provisional application No. 62/302,657, filed on Mar. 2, 2016.

(51) Int. Cl.
*H04B 7/155* (2006.01)
*H04B 17/364* (2015.01)
(Continued)

(52) U.S. Cl.
CPC ......... *H04B 7/155* (2013.01); *H04B 7/15507* (2013.01); *H04B 7/15542* (2013.01);
(Continued)

(58) Field of Classification Search
CPC ............... H04L 1/1861; H04L 2001/0097
(Continued)

(56) References Cited

U.S. PATENT DOCUMENTS

2008/0045144 A1  2/2008  Fujita
2011/0199919 A1  8/2011  Lin et al.
(Continued)

FOREIGN PATENT DOCUMENTS

WO    2010/137106 A1    12/2010

OTHER PUBLICATIONS

Shono, Takashi; WiMAX Textbook (WiMAX Kyokasho); Jul. 21, 2008. pp. 90-94, 167-178,186-202,262-283. Impress R&D; Tokyo, JP.

*Primary Examiner* — Natasha W Cosme

(57) ABSTRACT

An origination device transmits a "received data signal" to a signal forwarding device. The "received data signal" comprises a first set of data. The origination device also transmits at least one "received control signal" to the signal forwarding device and to a destination device. The at least one "received control signal" comprises a first set of control information and a second set of control information. The first and second sets of control information are both associated with the first set of data. The first set of control information contains instructions pertaining to the signal forwarding device processing the first set of data. The second set of control information contains instructions pertaining to the destination device processing the first set of data. The signal forwarding device transmits a "forwarded signal" to the destination device. The "forwarded signal" contains forwarded data, based on the first set of data.

20 Claims, 2 Drawing Sheets

(51) Int. Cl.
*H04L 1/18* (2006.01)
*H04L 1/00* (2006.01)

(52) U.S. Cl.
CPC ......... *H04B 17/364* (2015.01); *H04L 1/1861* (2013.01); *H04L 2001/0097* (2013.01)

(58) Field of Classification Search
USPC ........................................................ 370/315
See application file for complete search history.

(56) References Cited

U.S. PATENT DOCUMENTS

| | | | |
|---|---|---|---|
| 2011/0212685 A1* | 9/2011 | Nakagawa | H04B 7/15557 455/9 |
| 2012/0033609 A1 | 2/2012 | Suda | |
| 2012/0140796 A1 | 6/2012 | Dai et al. | |
| 2015/0043423 A1 | 2/2015 | Hadef et al. | |

* cited by examiner

SYSTEM AND METHOD FOR DUAL-CONTROL SIGNALING FOR THE RELAY SCENARIOS

CLAIM OF PRIORITY

The present application claims priority to Provisional Application No. 62/302,657, entitled "CONTROL SIGNALING FOR THE RELAY SCENARIOS," filed Mar. 2, 2016, and to Provisional Application No. 62/304,738, entitled "SYSTEM AND METHOD FOR DUAL-CONTROL SIGNALING FOR THE RELAY SCENARIOS," filed Mar. 7, 2016, both assigned to the assignee hereof and both hereby expressly incorporated by reference in their entirety.

FIELD

This invention generally relates to wireless communications and more particularly to providing control information to a signal forwarding device and to a destination device.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station, which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF), and decode and forward (DF) schemes.

SUMMARY

An origination device transmits a "received data signal" to a signal forwarding device. The "received data signal" comprises a first set of data. The origination device also transmits at least one "received control signal" to the signal forwarding device and to a destination device. The at least one "received control signal" comprises a first set of control information and a second set of control information. The first and second sets of control information are both associated with the first set of data. The first set of control information contains instructions pertaining to the signal forwarding device processing the first set of data. The second set of control information contains instructions pertaining to the destination device processing the first set of data. The signal forwarding device transmits a "forwarded signal" to the destination device. The "forwarded signal" contains forwarded data, based on the first set of data.

DETAILED DESCRIPTION

As discussed above, communication systems often employ repeaters, relays and self-backhauled base stations to forward signals transmitted between base stations and the UE devices served by the base stations. Signals may be forwarded from the base station to the UE device, from the UE device to the base station, or both. In some systems, scheduling of communication resources for the communication channel between the signal forwarding device (e.g., repeater, relay, etc.) and the UE device is performed by a scheduler at the base station or a central scheduler connected to the base station. In the examples discussed herein, it is assumed that the scheduler is located at, or connected to, a base station to/from which the signal forwarding device forwards signals. However, the scheduler may not be physically located at the base station and may be located at any other suitable location (e.g., at the signal forwarding device or elsewhere in the radio access network to which the base station belongs).

In a typical relay scenario, an anchor base station would only send control information applicable for the relay node. The relay node would decode the data and, depending on the UE device feedback regarding the communication link between the relay and the UE device, configure the appropriate control channel and re-allocate the data based on its own scheduler. However, for the examples discussed herein, various methods, devices, and systems will be described in which an anchor base station transmits two sets of control information that are both associated with the same data.

Since the signal forwarding device is central to the examples, the nomenclature used throughout the description centers on the signal forwarding device. More specifically, an "origination device" is a device from which a signal is transmitted to the signal forwarding device, and the signal being received at the signal forwarding device from an origination device is referred to as a "received signal." Similarly, a "destination device" is a device to which the signal forwarding device transmits a signal, which is referred to herein as a "forwarded signal." Moreover, although most of the following examples refer to a base station as the "origination device" and to a UE device as the "destination device," the examples may be modified so that the UE device is the "origination device," and the base station is the "destination device."

Figure 1:
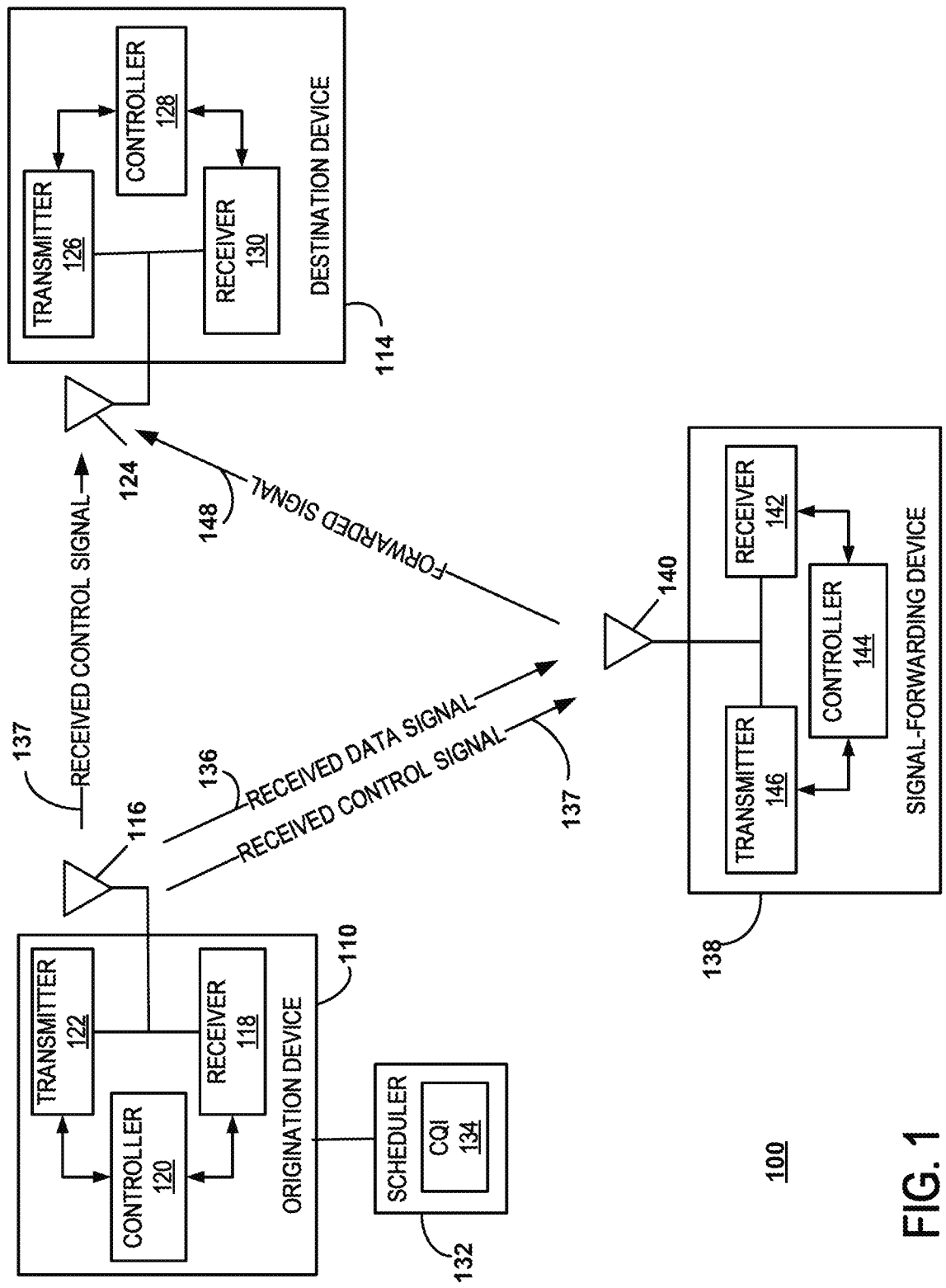
FIG. 1 is a block diagram of an example of a wireless communication system including an origination device, a signal forwarding device, and a destination device.

FIG. 1 is a block diagram of an example of a wireless communication system 100 including an origination device, a signal forwarding device, and a destination device. The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices.

In the example of FIG. 1, origination device 110 provides downlink wireless communication service to destination device 114. Thus, destination device 114 receives downlink signals (not shown) from origination device 110, either directly or via signal forwarding device 138. The downlink signals are received at the destination device 114 through antenna 124 and receiver 130. Destination device 114 further comprises a controller 128 and a transmitter 126. Origination device 110 transmits the downlink signals to destination device 114 via antenna 116 and transmitter 122. Origination device 110 further comprises a controller 120 and a receiver 118.

Scheduler 132 is located at origination device 110 in the example shown in FIG. 1. However, the system 100 could be modified so that the scheduler 132 is located at any other suitable location. The scheduler may be an application running on equipment connected directly to origination device 110 or connected through a backhaul or other communication link. Regardless of the location of scheduler 132, channel quality information (CQI) 134 regarding the various communication links within the system 100 is provided to scheduler 132, which uses the CQI 134 to schedule communication resources to be used by the various entities within the system 100. For the example shown in FIG. 1, the scheduler 132 utilizes CQI pertaining to the communication link between the origination device 110 and the destination device 114, CQI pertaining to the communication link between the origination device 110 and the signal forwarding device 138, and CQI pertaining to the communication link between the signal forwarding device 138 and the destination device 114. Based on the channel quality for at least one of these three communication links, the scheduler 132 schedules communication resources.

In the example shown in FIG. 1, origination device 110 transmits a received data signal 136 (e.g. a downlink signal) to the signal forwarding device 138, which receives the received data signal 136 via antenna 140 and receiver 142. The received data signal 136 comprises a first set of data.

Origination device 110 also transmits at least one received control signal 137 to both the signal forwarding device 138 and the destination device 114. In some cases, the at least one received control signal 137 comprises one received control signal that comprises a first set of control information and a second set of control information. In other examples, the at least one received control signal 137 comprises a plurality of received control signals that collectively comprise a first set of control information and a second set of control information. For example, the first set of control information could be sent in a first transmission, and the second set of control information could be sent in a second transmission.

Regardless of the number of signals/transmissions used to send the at least one received control signal 137, the at least one received control signal 137 comprises a first set of control information and a second set of control information. The first set of control information is associated with the first set of data and comprises instructions pertaining to the signal forwarding device 138 processing (e.g., demodulating, decoding, etc.) the first set of data. The second set of control information is also associated with the first set of data and comprises instructions pertaining to the destination device 114 processing (e.g., demodulating, decoding, etc.) the first set of data. Thus, the first and second sets of control information are both associated with the same set of data. In some examples, the first set of control information comprises instructions on one or more of the following: post-processing the first set of data at the signal forwarding device 138, decoding the first set of data at the signal forwarding device 138, and pre-processing the first set of data at the signal forwarding device 138 to generate forwarded data that is to be sent to the destination device 114.

The first set of control information may comprise one or more of the following: carrier frequency, resource allocation, modulation/coding rate, multiple input multiple output (MIMO) scheme details, hybrid automatic repeat request (HARQ) related information, and origination and/or destination identifiers. The signal forwarding device 138 can use any of the included information from the first set of control information to process the first set of data and/or generate forwarded data to be sent to the destination device 114. Similarly, the second set of control information may comprise one or more of the following: carrier frequency, resource allocation, modulation/coding rate, multiple input multiple output (MIMO) scheme details, hybrid automatic repeat request (HARQ) related information, and origination and/or destination identifiers. The destination device 114 can use any of the included information from the second set of control information to process the forwarded data, which is based on the first set of data and is transmitted by the signal forwarding device 138.

In some examples, the at least one received control signal 137 is transmitted by origination device 110 as one or more beamformed downlink signals. In such a scenario, transmitter 122 of the origination device 110 is configured to: transmit the first set of control information using a first spatial vector, and transmit the second set of control information using a second spatial vector. More specifically, the first set of control information may be transmitted using spatial vector $e_1$, and the second set of control information may be transmitted using spatial vector $e_2$, for example.

In other examples, the at least one received control signal 137 is transmitted by origination device 110 using different coding rates for the first and second sets of control information. For example, the origination device 110 may have an encoder (not shown) that is configured to: encode the first set of control information at a first coding rate, and encode the second set of control information at a second coding rate. More specifically, the first set of control information may be encoded at a ⅔ coding rate, and the second set of control information may be encoded at a ⅓ coding rate, for example.

In further examples, the at least one received control signal 137 is transmitted by origination device 110 using different modulation techniques for the first and second sets of control information. For example, the transmitter 122 of origination device 110 may have a modulator (not shown) that is configured to: modulate the first set of control information according to a first modulation technique, and modulate the second set of control information according to a second modulation technique. In this regard, any suitable modulation technique may be used to modulate the first and second sets of control information, respectively.

The signal forwarding device 138 further comprises controller 144 and transmitter 146, as well as other electronics, hardware, and code. The signal forwarding device 138 is any fixed, mobile, or portable equipment that performs the functions described herein. The various functions and operations of the blocks described with reference to the signal forwarding device 138 may be implemented in any number of devices, circuits, or elements. Two or more of the functional blocks may be integrated in a single device, and the functions described as performed in any single device may be implemented over several devices.

The controller 144 includes any combination of hardware, software, and/or firmware for executing the functions described herein as well as facilitating the overall functionality of the signal forwarding device 138. An example of a suitable controller 144 includes code running on a microprocessor or processor arrangement connected to memory. The transmitter 146 includes electronics configured to transmit wireless signals to destination device 114. In some situations, the transmitter 146 may include multiple transmitters. The receiver 142 includes electronics configured to receive wireless signals from origination device 110. In some situations, the receiver 142 may include multiple receivers. The receiver 142 and transmitter 146 receive and transmit signals, respectively, through an antenna 140. The antenna 140 may include separate transmit and receive antennas. In some circumstances, the antenna 140 may include multiple transmit and receive antennas.

The transmitter 146 and receiver 142 in the example of FIG. 1 perform radio frequency (RF) processing including modulation and demodulation. The receiver 142, therefore, may include components such as low noise amplifiers (LNAs) and filters. The transmitter 146 may include filters and amplifiers. Other components may include isolators, matching circuits, and other RF components. These components in combination or cooperation with other components perform the signal forwarding functions. The required components may depend on the particular signal forwarding scheme that is employed. As discussed more fully below, for the example shown in FIG. 1, the first set of data contained in the received data signal 136 is demodulated without decoding the demodulated signal, and the resulting symbols are modulated and transmitted as part of the forwarded signal 148. However, in other examples, the first set of data may also be decoded before generating the forwarded signal 148, which comprises forwarded data that is based, at least partially, on the first set of data.

The transmitter 146 includes a modulator (not shown), and the receiver 142 includes a demodulator (not shown). The modulator modulates the signals to be transmitted as part of the forwarded signal 148 and can apply any one of a plurality of modulation orders. As is known, the modulation order determines the number of different symbols that are used to represent the transmitted data for digital modulation. There is a trade-off between modulation order, required energy, and bit-error rate (BER). As the modulation order is increased, the average energy per bit must also be increased to maintain the same BER. The demodulator demodulates the received data signal 136 and the at least one received control signal 137, both in accordance with one of a plurality of modulation orders. The modulation order for transmissions to the destination device 114, however, is established by scheduler 132.

For the example shown in FIG. 1, the signal forwarding device 138 may be a fixed device or apparatus that is installed at a particular location at the time of system deployment. Examples of such equipment include fixed base stations or fixed transceiver stations. In some situations, the signal forwarding device 138 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer.

In still other situations, the signal forwarding device 138 may be a portable device that is not fixed to any particular location. Accordingly, the signal forwarding device 138 may be a portable user device such as a UE device in some circumstances. In some implementations, the signal forwarding device 138 may be a base station, eNB, or access point that performs signal forwarding functions in addition to serving UE devices. For example, a self-backhauled eNB, connected to an anchor eNB, may be configured to perform signal forwarding functions for some UE devices in addition to directly serving other UE devices utilizing the wireless backhaul to the origination device 110 (e.g., anchor eNB).

The signal forwarding device 138 may also apply one or more of the signal forwarding schemes, discussed in detail below, when forwarding an incoming signal. In the example shown in FIG. 1, the signal forwarding device 138 applies a single signal forwarding scheme to the received data signal 136. Alternatively, the signal forwarding device 138 may dynamically apply one or more signal forwarding schemes to received data signal 136 or to a portion thereof. For example, signal forwarding device 138 may apply different signal forwarding schemes for different portions of the received data signal 136.

The first set of control information may additionally include instructions regarding which signal forwarding scheme should be applied by the signal forwarding device 138 when processing the received data signal 136 and generating the forwarded signal 148. For example, the signal forwarding scheme can be selected from one or more of: an amplify and forward (AF) signal forwarding scheme, a decode and forward (DF) signal forwarding scheme, a partial decode and forward (PDF) signal forwarding scheme, and a direct origination device-to-destination device signal forwarding scheme.

The signal forwarding device 138 is capable of applying at least one type of partial decode and forwarding (PDF) signal forwarding scheme when forwarding an incoming signal. In some situations, the signal forwarding device 138 may be capable of applying more than one type of signal forwarding scheme. The signal forwarding device 138, for example, may be able to apply at least one of an amplify and forward (AF) scheme, decode and forward (DF) scheme, and a PDF scheme. As discussed herein, a signal forwarding scheme is based on the parameters, techniques, and/or level of processing applied to the incoming signal to generate the forwarded signal 148. Signal forwarding schemes can be categorized into three basic groups.

For example, repeater signal forwarding schemes generally include retransmission schemes where the incoming signal is received and retransmitted. At a minimum, the incoming signal (e.g., received data signal 136) is amplified and retransmitted as the forwarded signal 148. In some repeater schemes, some processing is applied to the incoming signal. For example, the incoming signal may also be filtered and/or frequency shifted. Generally, however, the incoming signal is not demodulated or decoded in a repeater signal forwarding scheme. Repeater schemes are sometimes referred to as amplify and forward (AF) schemes.

Relay signal forwarding schemes include at least some decoding of the incoming signal to create the forwarded signal where the level of decoding can range from minimal to complete decoding of the incoming signal. Complete decoding includes fully decoding the incoming signal to extract the payload and then applying the decoded data to generate the new forwarded signal. Complete decoding schemes are sometimes referred to as decode and forward (DF) schemes. Several proposed techniques include partial decoding of the incoming signal to transmit a forwarded signal without complete decoding to extract the data from the signal. These schemes are sometimes referred to as partial decode and forward (PDF) schemes.

The AF signal forwarding scheme results in a relatively low-processing delay since baseband signal processing is not performed. In most cases, this scheme has relatively poor performance because of the increase in noise during the signal amplification. AF schemes, however, minimize latency because of the relatively low level of processing. A signal forwarded by a DF signal forwarding scheme, however, has much lower noise due to baseband processing performed to decode the signal, resulting in noise cancellation. The lower noise benefit comes with the cost of increased processing delay, resulting in a relatively high latency. Often, PDF signal forwarding schemes are considered to have an appropriate tradeoff between signal quality and latency relative to DF and AF schemes. For the example shown in FIG. 1, the first set of data contained in the received data signal 136 is demodulated without decoding the demodulated signal, and the resulting symbols are modulated and transmitted as part of the forwarded signal 148. Since the first set of data is not completely decoded, however, processing delays are reduced significantly compared to DF schemes. However, in other examples, the first set of data may also be decoded before generating the forwarded signal 148, which comprises forwarded data that is based, at least partially, on the first set of data.

The PDF scheme applied by the signal forwarding device 138 in the exemplary embodiments includes accumulating fewer received symbols to form a lower-order modulation symbol before retransmission. This scenario occurs because a typical link between the signal forwarding device 138 and the destination device 114 has a relatively lower signal-to-noise ratio (SNR) compared to the link between the origination device 110 and the signal forwarding device 138. In some situations, for example, the origination device-to-signal forwarding device (OD-SFD) channel between the origination device 110 and the signal forwarding device 138 is typically static because both devices are fixed, whereas the signal forwarding device-to-destination device (SFD-DD) channel between the signal forwarding device 138 and the destination device 114 is generally dynamic because the destination device 114 is mobile.

Regardless of which signal forwarding scheme is applied to the received data signal 136, origination device 110 transmits the at least one received control signal 137 to both the signal forwarding device 138 and the destination device 114. The at least one received control signal 137 is transmitted over a dual-control channel, containing both the first and second sets of control information, such that the at least one received control signal 137 can be delivered using layered modulation, Frequency Division Multiplexing, Code Division Multiplexing, Time Division Multiplexing, or Space Division Multiple Access (SDMA). If SDMA is used, a first beamformed downlink signal is directed towards the signal forwarding device 138, and a second beamformed downlink signal is directed towards the destination device 114.

Transmission of the at least one received control signal 137 over a dual-control channel is useful in scenarios in which (1) the control plane delivery of the origination device 110 can easily reach both the signal forwarding device 138 and the destination device 114 (e.g., due to a lower modulation order), and (2) the data plane delivery of the origination device 110 cannot directly reach the destination device 114. Moreover, if the Physical Downlink Control Channel (PDCCH) is used for the delivery of the first and second sets of control information, the search space associated with transmitting the control information to the signal forwarding device 138 can be different from the search space associated with transmitting the control information to the destination device 114. If this is the case, the two different PDCCH search spaces are both mapped to the same data resource in the Physical Downlink Shared Channel (PDSCH).

As described above, signal forwarding device 138 processes the first set of data contained in the received data signal 136 in accordance with the first set of control information. The signal forwarding device 138 has a controller 144 that is configured to generate a forwarded signal 148. In generating the forwarded signal 148, the signal forwarding device 138 may apply any pre-processing instructions, which were included in the first set of control information, to the first set of data to generate forwarded data. The forwarded signal 148 comprises the forwarded data, based at least partially on the first set of data.

The signal forwarding device 138 transmits the forwarded signal 148 via transmitter 146 and antenna 140 to the destination device 114. In this manner, the signal forwarding device 138 transmits the first set of data to the destination device 114. For the examples discussed herein, the forwarded signal 148 is transmitted within a single frequency band of the SFD-DD channel. The incoming received data signal 136 is transmitted within an origination device-to-signal forwarding device channel (OD-SFD channel), which also includes a single frequency band. However, any combination of frequency bands and frequency sub-bands may be used for the OD-SFD channel and the SFD-DD channel.

In the example shown in FIG. 1, the destination device 114 is aware of the expected time delay between reception of the at least one received control signal 137 at the destination device 114 and reception of the forwarded signal 148 at the destination device 114. For example, the expected time delay could be equal to the sum of the propagation delay between the origination device 110 and the signal forwarding device 138, the processing delay at the signal forwarding device 138, and the propagation delay between the signal forwarding device 138 and the destination device 114. Alternatively, the expected time delay could be fixed (e.g., could be a multiple of the subframe). For example, the expected time delay could be 1 subframe when it is known that the destination device 114 will receive the at least one received control signal 137 1 subframe in advance of receiving the forwarded signal 148. Regardless of the manner used to determine the expected time delay, the expected time delay may be provided to the destination device 114 or may be determined by a controller 128 of the destination device 114.

In yet other examples, an association sequence number or an n-bit Downlink Control Information (DCI) indicator may be used to associate a particular at least one received control signal 137 with a particular forwarded signal 148. More specifically, the origination device 110 provides the association sequence number or n-bit DCI indicator, which has been assigned to a particular received control signal 137, to the signal forwarding device 138 and to the destination device 114. The signal forwarding device 138 includes the assigned association sequence number or n-bit DCI indicator in the forwarded signal 148. Thus, the destination device 114 can determine that a particular received control signal 137 and a particular forwarded signal 148 correspond to each other if the received control signal 137 and the forwarded signal 148 have been assigned the same association sequence number or n-bit DCI indicator.

In some examples, upon receiving the forwarded signal 148, the controller 128 of the destination device 114 is configured to measure the forwarded signal 148 to obtain channel measurements associated with a signal forwarding device-to-destination device (SFD-DD) channel between the signal forwarding device 138 and the destination device 114. After measuring the forwarded signal 148, the transmitter 126 of destination device 114 transmits the SFD-DD channel measurements to the origination device 110. The SFD-DD channel measurements can be transmitted directly to origination device 110. Alternatively, the SFD-DD channel measurements can be initially transmitted to signal forwarding device 138, and signal forwarding device 138 can subsequently transmit the SFD-DD channel measurements to origination device 110.

In some examples, destination device 114 can also transmit the SFD-DD channel measurements to origination device 110, either directly or indirectly through signal forwarding device 138, as part of a feedback signal. Alternatively, the SFD-DD channel measurements can be transmitted separately from the feedback signal. For example, the feedback signal can include a downlink channel feedback report comprising downlink channel measurements related to one or more downlink signals received by the destination device 114. For example, the downlink channel feedback report may contain downlink channel measurements for downlink signals received from the origination device 110 and/or downlink channel measurements for one or more downlink signals received from one or more base stations other than origination device 110. The downlink channel feedback report can additionally include the location of the resources (e.g., time slots, subcarriers, reference signal, etc.) on which the downlink channel measurements were made.

The downlink channel feedback report may also identify a carrier on which the downlink channel measurements were made, a cell identifier associated with origination device 110 that transmitted the downlink signals, and/or a spatial vector associated with a beamformed downlink signal. In some examples, the downlink channel feedback report may identify a cell identifier associated with a base station, other than origination device 110, that transmitted the downlink signal. This scenario might occur when the downlink signal is received from a base station other than origination device 110, but the destination device 114 needs to submit the downlink channel feedback report to the scheduler 132 located at the origination device 110.

In yet another scenario, destination device 114 can receive downlink signals from a first device (e.g., origination device 110), as the primary carrier of the downlink signals, and can also receive downlink signals from a second device (e.g., signal forwarding device 138 or a base station other than origination device 110), as the secondary carrier of the downlink signals. In such a scenario, the downlink channel feedback report may (1) identify the primary carrier and/or the secondary carrier on which the downlink channel measurements were made, (2) include a cell identifier associated with the first device that transmitted the primary carrier and/or a cell identifier associated with the second device that transmitted the secondary carrier, and/or (3) include a spatial vector associated with each of one or more beamformed downlink signals, respectively.

Alternatively, the feedback signal can include an acknowledgment response, which can be either a positive acknowledgment response (ACK) or a negative acknowledgment response (NACK). The ACK message indicates that a downlink signal was successfully received by the destination device 114. The NACK message indicates that the downlink signal was not successfully received by the destination device 114. In some situations, the ACK/NACK message is a message that is forwarded on to the origination device 110 by the signal forwarding device 138. In other situations, it is a message intended for the signal forwarding device 138. In still other situations, the ACK message can be an indication to both the signal forwarding device 138 and the origination device 110. In scenarios in which the feedback signal includes an acknowledgment response, the feedback signal may additionally identify a carrier on which the downlink signal was received, a cell identifier associated with origination device 110 that transmitted the downlink signal, a cell identifier associated with a base station, other than origination device 110, that transmitted the downlink signal, and/or a spatial vector associated with a beamformed downlink signal.

Regardless of the contents of the feedback signal, the SFD-DD channel measurements can be transmitted along with, or separate from, the feedback signal to the origination device 110, either directly or through signal forwarding device 138. Upon receipt of the SFD-DD channel measurements, the controller 120 of the origination device 110 is configured to modify the received data signal 136 and/or the at least one received control signal 137, based at least partially on the SFD-DD channel measurements. For example, the at least one received control signal 137 may be modified by changing the first set of control information, the second set of control information, or both. Similarly, the controller 120 of the origination device 110 can be further configured to select, based at least partially upon the SFD-DD channel measurements, a signal forwarding scheme from one of the signal forwarding schemes discussed above.

Figure 2:
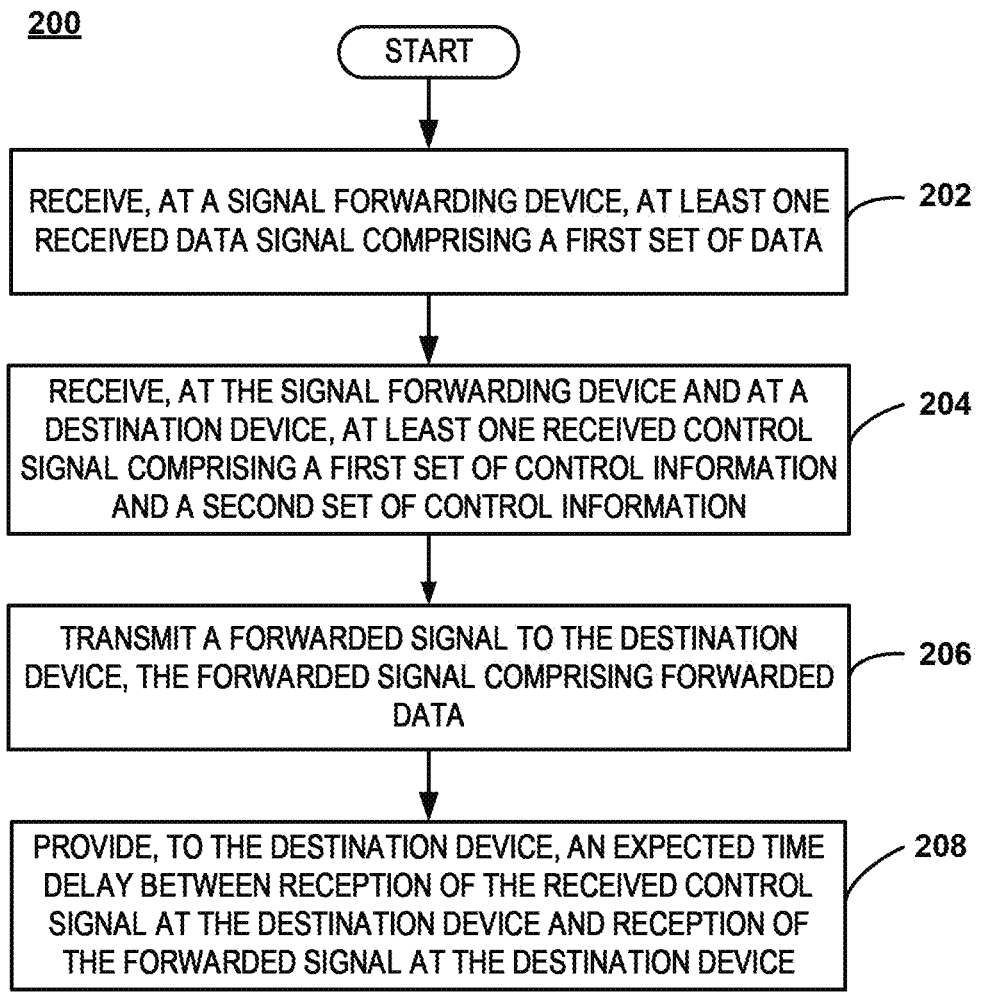
FIG. 2 is a flowchart of an example of a method of utilizing the wireless communication system of FIG. 1 to provide control information to a signal forwarding device and to a destination device.

FIG. 2 is a flowchart of an example of a method 200 of utilizing the wireless communication system of FIG. 1 to provide control information to a signal forwarding device and to a destination device. More specifically, the method of FIG. 2 describes how to provide (1) a first set of data to a destination device via a signal forwarding device, and (2) a first set of control information and a second set of control information, both associated with the first set of data, to the signal forwarding device and the destination device. The method begins, at step 202, with receiving at least one received data signal 136 at signal forwarding device 138. The at least one received data signal 136 comprises a first set of data.

At step 204, at least one received control signal 137 is received at the signal forwarding device 138 and the destination device 114. As described above, the at least one received control signal 137 may comprise only a single received control signal or a plurality of received control signals. The at least one received control signal 137 comprises a first set of control information and a second set of control information, both of which are associated with the first set of data. The first set of control information is associated with the first set of data and comprises instructions pertaining to the signal forwarding device 138 processing the first set of data. The first set of control information may also comprise instructions on at least one of: post-processing the first set of data, decoding the first set of data, and pre-processing the first set of data to generate the forwarded data. The second set of control information is associated with the first set of data and comprises instructions pertaining to a destination device 114 processing the first set of data.

Upon receipt of the received data signal 136, the signal forwarding device 138 generates a forwarded signal 148 in accordance with the first set of control information. The forwarded signal 148 comprises forwarded data, based at least partially on the first set of data. At step 206, the forwarded signal 148 is transmitted to destination device 114. Upon receiving the forwarded signal 148, the destination device 114 processes the forwarded signal 148 in accordance with the second set of control information, which was previously transmitted to the destination device 114 as part of the at least one received control signal 137.

At step 208, an expected time delay is provided to the destination device 114. The expected time delay is a delay between reception of the at least one received control signal 137 at the destination device 114 and reception of the forwarded signal 148 at the destination device 114. The expected time delay can be provided to the destination device 114 or determined by the destination device 114. Moreover, the expected time delay can be fixed or can be determined based on an expected/measured sum of the propagation delay between the origination device 110 and the signal forwarding device 138, the processing delay at the signal forwarding device 138, and the propagation delay between the signal forwarding device 138 and the destination device 114.

Although not shown explicitly in FIG. 2, the method 200 may also include the destination device 114 measuring the forwarded signal 148 to obtain channel measurements for the signal forwarding device-to-destination device (SFD-DD) channel. Subsequently, the destination device 114 transmits the SFD-DD channel measurements, directly or indirectly through signal forwarding device 138, to the origination device 110 that transmitted the received data signal 136. As mentioned above, the destination device 114 can also transmit the SFD-DD channel measurements to origination device 110 as part of a feedback/acknowledgment signal.

In other examples, the method 200 may additionally include origination device 110 modifying the received data signal 136 and/or the at least one received control signal 137, based on the SFD-DD channel measurements received from the destination device 114. Origination device 110 can also select a signal forwarding scheme based at least partially on the SFD-DD channel measurements, as discussed above.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at a signal forwarding device, at least one received data signal comprising a first set of data;
   receiving, at the signal forwarding device and at a destination device, at least one received control signal comprising a first set of control information and a second set of control information, the first set of control information associated with the first set of data and comprising instructions pertaining to the signal forwarding device processing the first set of data, the second set of control information associated with the first set of data and comprising instructions pertaining to the destination device processing the first set of data; and
   transmitting, from the signal forwarding device, a forwarded signal to the destination device, the forwarded signal comprising forwarded data, based at least partially on the first set of data.

2. The method of claim 1, wherein the at least one received control signal comprises one received control signal that comprises the first set of control information and the second set of control information.

3. The method of claim 1, wherein the at least one received control signal comprises a plurality of received control signals, the plurality of received control signals collectively comprising the first set of control information and the second set of control information.

4. The method of claim 1, further comprising:
   providing, to the destination device, an expected time delay between reception of the at least one received control signal at the destination device and reception of the forwarded signal at the destination device.

5. The method of claim 1, wherein the first set of control information is transmitted using a first spatial vector, and the second set of control information is transmitted using a second spatial vector.

6. The method of claim 1, wherein the first set of control information is encoded at a first coding rate, and the second set of control information is encoded at a second coding rate.

7. The method of claim 1, wherein the first set of control information is modulated according to a first modulation technique, and the second set of control information is modulated according to a second modulation technique.

8. The method of claim 1, wherein the first set of control information comprises at least one of the following: carrier frequency, resource allocation, modulation/coding rate, multiple input multiple output (MIMO) scheme details, hybrid automatic repeat request (HARQ) related information, and origination and/or destination identifiers.

9. The method of claim 1, wherein the second set of control information comprises at least one of the following: carrier frequency, resource allocation, modulation/coding rate, multiple input multiple output (MIMO) scheme details, hybrid automatic repeat request (HARQ) related information, and origination and/or destination identifiers.

10. The method of claim 1, further comprising:
    assigning at least one of: an association sequence number and an n-bit Downlink Control Information (DCI) indicator to identify which particular at least one received control signal corresponds to which particular forwarded signal.

11. A system comprising:
    an origination device comprising a transmitter configured to transmit at least one received data signal comprising a first set of data; and
    a signal forwarding device comprising:
       a receiver configured to receive the at least one received data signal, and
       a transmitter configured to transmit a forwarded signal to a destination device, the forwarded signal comprising forwarded data, based at least partially on the first set of data,
    the transmitter of the origination device further configured to transmit, to the signal forwarding device and to the destination device, at least one received control signal comprising a first set of control information and a second set of control information, the first set of control information associated with the first set of data and comprising instructions pertaining to the signal forwarding device processing the first set of data, the second set of control information associated with the first set of data and comprising instructions pertaining to the destination device processing the first set of data.

12. The system of claim 11, wherein the at least one received control signal comprises one received control signal that comprises the first set of control information and the second set of control information.

13. The system of claim 11, wherein the at least one received control signal comprises a plurality of received control signals, the plurality of received control signals collectively comprising the first set of control information and the second set of control information.

14. The system of claim 11, where the destination device further comprises a controller configured to determine an expected time delay between reception of the at least one received control signal at the destination device and reception of the forwarded signal at the destination device.

15. The system of claim 11, wherein the first set of control information is transmitted using a first spatial vector, and the second set of control information is transmitted using a second spatial vector.

16. The system of claim 11, wherein the first set of control information is encoded at a first coding rate, and the second set of control information is encoded at a second coding rate.

17. The system of claim 11, wherein the first set of control information is modulated according to a first modulation technique, and the second set of control information is modulated according to a second modulation technique.

18. The system of claim 11, wherein the first set of control information comprises at least one of the following: carrier frequency, resource allocation, modulation/coding rate, multiple input multiple output (MIMO) scheme details, hybrid automatic repeat request (HARQ) related information, and origination and/or destination identifiers.

19. The system of claim 11, wherein the second set of control information comprises at least one of the following: carrier frequency, resource allocation, modulation/coding rate, multiple input multiple output (MIMO) scheme details, hybrid automatic repeat request (HARQ) related information, and origination and/or destination identifiers.

20. The system of claim 11, wherein the origination device further comprises a controller configured to assign at least one of: an association sequence number and an n-bit Downlink Control Information (DCI) indicator to a particular at least one received control signal, the transmitter of the origination device further configured to transmit the assigned at least one of: an association sequence number and an n-bit DCI indicator to the signal forwarding device and to the destination device, the transmitter of the signal forwarding device further configured to include the assigned at least one of: an association sequence number and an n-bit DCI indicator in the forwarded signal.

* * * * *